Sept. 7, 1937.  J. M. CRAIGO  2,092,549

DENTAL DAM

Filed Dec. 5, 1936

Inventor
JOHN M. CRAIGO

By W. Clay Lindsey.
Attorney

Patented Sept. 7, 1937

2,092,549

UNITED STATES PATENT OFFICE 2,092,549

DENTAL DAM

John M. Craigo, Hartford, Conn.

Application December 5, 1936, Serial No. 114,420

6 Claims. (Cl. 32—34)

This invention relates to an improved type of dam for dental use and, more particularly, to a resiliently deformable, pre-shaped member adapted to isolate one or more teeth in such manner as to make said teeth conveniently accessible for dental work thereon.

An aim of the invention is to provide an improved, flexible, resilient dental dam which may be easily applied and removed from the teeth without the use of dental instruments and which may be easily deformed during a dental operation and yet will isolate one or more teeth in such manner that all portions of said teeth above the gum line are easily accessible for dental work.

More particularly, an aim of the invention is to provide an improved, resiliently deformable, cup-shaped dam member of such configuration and shape that it may be easily applied to any of the selected teeth within the mouth and, when applied, will form an isolated, unobstructed chamber about the tooth or teeth to be operated upon without unduly obstructing the view of the teeth or materially interfering with the dental operations to be performed.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein like parts are indicated by like numerals:

Figure 1:
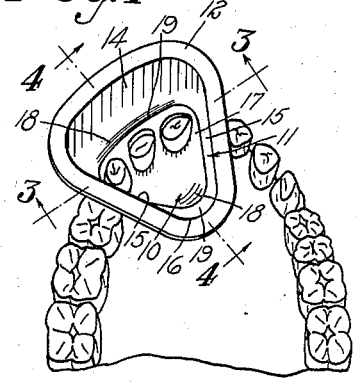
Figure 1 is a perspective view showing one embodiment of my invention in position to isolate three teeth.
Figure 2:
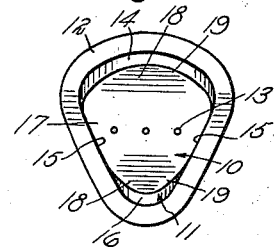
Fig. 2 is a plan view of the rubber dam illustrated in Fig. 1.
Figure 3:
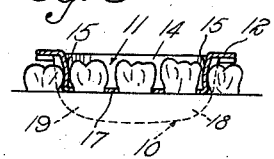
Fig. 3 is a sectional view taken substantially along line 3—3 of Fig. 1.

Referring to the drawing in detail, and particularly to the embodiment of my invention disclosed in Figs. 1 to 5, inclusive, my improved dam comprises a unitary, preformed, rubber cup member of generally triangular shape and having a thin bottom wall 10 and a thin peripheral wall 11. The dam is composed of resilient, elastic rubber so that the walls thereof are inherently elastic in all directions to permit the dam to be easily applied; the walls are sufficiently resilient to cause the dam to tend to assume and maintain its peripheral contour; and the walls of the dam are sufficiently flexible to be easily deformed without obstructing or inconveniencing the dental work to be carried out. To aid the rubber dam in normally maintaining or assuming its preformed contour and shape, the dam is provided at the upper edge of its peripheral wall with a continuous, laterally extending flange 12. The bottom wall of the dam is provided along its medial transverse line with one or more small apertures 13 adapted to receive the tooth or teeth to be isolated. Three such apertures are shown in the present instance in order that three teeth may be isolated, but it is evident that the dam may have any suitable number of such apertures depending upon the size of the dam and the number of teeth to be segregated from the adjacent teeth in the jaw. These apertures, of course, are smaller in diameter than the tooth portions which they are to receive so that, when the dam is applied, the edges of the apertures will snugly hug the teeth.

By preference, the front portion 14 of the peripheral wall of the dam is transversely curved to correspond generally to the curvature of the line of the teeth, and the side portions 15 of the peripheral wall converge towards each other as they progress away from the front portion so that the dam, in plan view, generally tapers down in width towards its rear end, thus making the dam of generally triangular or of truncated triangular shape, this arrangement being of advantage in that the dam may be applied to any of the teeth of the jaw without material puckering of the dam or reducing the available working area of the cavity or chamber provided by the dam. In the embodiment shown in Figs. 1 to 5, the inclined side portions of the peripheral wall merge into an outwardly curved rear portion 16.

The bottom wall of the dam is preferably saddle-shaped, it having a transverse central raised portion 17 containing the apertures 13 and merging into downwardly and outwardly inclined portions 18 which, in turn, curve upwardly and merge into the peripheral wall 11. It will be appreciated that the bottom wall provides a saddle and, when in position, the inclined portions 18 straddle the dental arch and may conform to the general contour of the arch adjacent the isolated teeth. The bottom wall provides a pair of grooves or pockets 19 extending generally longitudinally, and disposed on opposite sides, of the dental arch.

Figure 4:
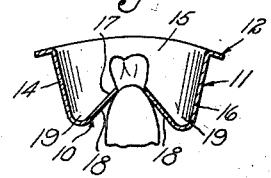
Fig. 4 is a sectional view taken substantially on line 4—4 of Fig. 1 and showing how the dam engages a tooth at its base line and conforms to the dental arch to provide ample working space about the isolated teeth.
Figure 5:
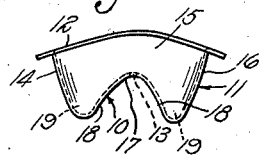
Fig. 5 is a side elevational view of the dam.

By preference, the edge of the cup at its open end, and, more particularly, in the present instance, the flange 12, is arched or convexly curved from the forward to the rear end of the cup as will be seen most clearly from Figs. 4 and 5. Hence, when my invention is located in position to isolate one or more teeth, the flanged portion 12 of the cup will be convexly curved from the labial or buccal portion of the mouth to the lingual portion of the mouth. I have found that if this flange is normally uni-planar, there would be a tendency, when the dam is positioned about the teeth to be isolated, for the forward and rear ends of the cup to curve or project upwardly above the central portion thereof and interfere with the view of the teeth and the manipulation of the dentist's tools employed in operating on the teeth. By arching the flange as described, this objection is avoided for, while the front and rear portions of the cup may be caused to flex upwardly somewhat, it will be seen from a relative examination of Figs. 4 and 5, the extent of such upward flexure is immaterial from the practical standpoint.

Figure 6:
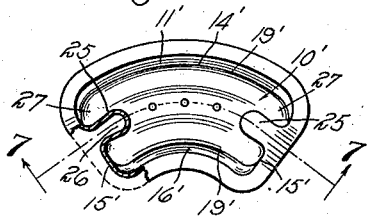
Fig. 6 is a top plan view disclosing another embodiment of my invention, a portion of the flange or rim of the dam being broken away for purposes of illustration.
Figure 7:
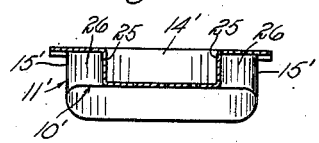
Fig. 7 is a transverse sectional view through the dam shown in Fig. 6, this view being taken substantially on line 7—7 of that figure.

The dental dam shown in Figs. 6 and 7 is generally similar to that illustrated in the preceding embodiment. It has a saddle-shaped bottom wall 10' and a peripheral wall 11' with a front curved portion 14' and side portions or sections 15', the latter being inclined towards each other as they progress away from the front portion. In the embodiment shown in Figs. 6 and 7, however, the peripheral wall has a rear portion 16' curved generally correspondingly to the front wall portion 14'. The side wall portions 15' have inward bends 25 which provide external end recesses 26 for accommodating the teeth adjacent the last two isolated teeth. The inner portion of each bend is adapted to fit between the last isolated tooth and the next adjacent tooth of the jaw. It will be appreciated that, with this arrangement, the pockets 19' formed between the outwardly inclined bottom wall portions and the front and rear peripheral wall portions terminate in end cavities 27 so that free access is had to all portions of each of the isolated teeth.

From the foregoing description taken in connection with the accompanying drawing, it will be seen that I provide a preformed and integral, elastic, and deformable rubber dam which may be easily applied to the teeth to be isolated and which, when applied, effectively prevents the flow of saliva into the isolated area surrounding the teeth, the arrangement being such that all portions of the isolated teeth above the gum line are easily accessible for dental work. The dam is of such preformed contour that the bottom wall thereof will extend away from the isolated teeth and conform generally to the gum portions of the dental arch adjacent the base of said teeth. The dam, when applied, will tend to maintain its preformed contour and yet it remains sufficiently flexible and resilient to allow it to be readily deformed when pressure is applied thereto without obstructing or inconveniencing the dental work being carried out. In the event that a cavity is being filled beneath the normal gum line, the bottom wall of the dam may be pressed against the gum moving the gum near the root of the tooth and yet maintaining said tooth isolated from other parts of the mouth whereby the cavity may be easily filled.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A dental dam comprising a pre-shaped deformable member having a substantially cup shaped contour and provided with merging peripheral and bottom walls, said walls being readily elastic, resilient, and flexible and tending to maintain the member in its pre-shaped contour independently of other support, said peripheral wall having a curved front portion for location within the labial or buccal portion of a mouth and interconnecting side wall portions, said side wall portions converging as they progress away from said curved portion and into the lingual portion of the mouth, the bottom wall having a tooth receiving aperture therethrough, and the peripheral edge of the open end of the side walls being convexly curved from the front to the rear of said member.

2. A dental dam comprising a pre-formed substantially cup-shaped resilient rubber member generally triangular in contour and having resilient deformable merging side and bottom walls which tend to maintain said member in its preshaped contour independently of other support, said bottom wall having an intermediate raised portion extending between two side walls, said raised portion having a tooth receiving aperture therethrough in spaced relation to said side walls, the top of said side walls terminating in a peripherally extending, resiliently reinforcing flange, and said flange being longitudinally curved transversely of the raised portion whereby the upper edges of the dam will not interfere with the application of dental tools within the dam and the dam will tend to assume its pre-formed shape.

3. A dental dam comprising a pre-shaped, resilient, integrally formed rubber member provided with merging side and bottom walls forming a substantially triangular shaped inner cavity, said bottom wall being saddle-shaped to generally conform with the curvature of a dental arch and having a tooth receiving aperture intermediate of said side walls, the tops of said side walls terminating in a resilient rubber laterally extending flange, said flange being longitudinally curved along the top edges of two of said side walls whereby the dam may be stretched into position and extend from the labial or buccal portion of a mouth into the lingual portion of the mouth to isolate a tooth from other teeth in a jaw to prevent distortion of the member when applied in position and to facilitate application of dental tools within the dam.

4. A dental dam, comprising a resilient cup having a saddle shaped bottom wall shaped substantially to the configuration of the dental arch and having spaced side walls providing depressed portions at opposite sides of the arch.

5. A dental dam, comprising a cup shaped body portion of substantially triangular configuration and having a bottom wall with a transverse arched portion and spaced side walls extending into the cup and extending between the angularly disposed sides thereof for engagement over a tooth and providing depressions in the cup at the opposite sides of the transverse arch adapted to lie at opposite sides of the dental arch inwardly of the neck of the tooth for admitting access of dental instruments to the opposite sides of the tooth.

6. A dental dam, comprising a cup shaped resilient body having a saddle shaped bottom providing a tooth engaging arch and depressions at opposite sides thereof for engagement about a tooth and with the saddle shaped bottom sloping and adapted to engage against the opposite sides of the dental arch, said cup shaped body having in its side walls inwardly offset portions adapted to engage about teeth adjacent and exterior to the cup and providing extensions of the depressions in said saddle shaped bottom of the cup.

JOHN M. CRAIGO.